United States Patent [19]

Van Velzen et al.

[11] Patent Number: 5,354,436
[45] Date of Patent: Oct. 11, 1994

[54] PROCESS FOR REMOVING NITROGEN COMPOUNDS FROM A LIQUID

[75] Inventors: Daniel Van Velzen, Brebbia; Heinrich Langenkamp, Cadrezzate, both of Italy; Ariel Moryoussef, Paris, France

[73] Assignee: European Atomic Energy Community (Euratom)

[21] Appl. No.: 829,032
[22] PCT Filed: Aug. 6, 1990
[86] PCT No.: PCT/EP90/01285
§ 371 Date: Jan. 31, 1992
§ 102(e) Date: Jan. 31, 1992
[87] PCT Pub. No.: WO91/01947
PCT Pub. Date: Feb. 21, 1991

[30] Foreign Application Priority Data

Aug. 7, 1989 [EP] European Pat. Off. ........ 89114525.2

[51] Int. Cl.$^5$ .............................. C02F 1/76; C25B 1/24
[52] U.S. Cl. ..................................... 204/102; 204/130; 204/151; 204/182.4; 423/235
[58] Field of Search ............... 204/151, 182.4, 130, 204/102; 423/235, 235 D, 237, 238, 239

[56] References Cited

U.S. PATENT DOCUMENTS 3,943,228  3/1976  Dezael et al. ............... 204/102
4,397,719  8/1983  Yoshida ...................... 204/91

FOREIGN PATENT DOCUMENTS 0243889  4/1987  European Pat. Off. .

Primary Examiner—John Niebling
Assistant Examiner—Arun S. Phasge
Attorney, Agent, or Firm—Sughrue, Mion, Zinn, Macpeak & Seas

[57] ABSTRACT

The invention concerns a device and a method for removing nitrogen compounds from an aqueous liquid containing nitrogen oxides ($NO_x$) and/or nitrates ($NO_3^-$). It comprises an electrochemical cell (10) with a cathode and an anode and a current source applied thereto. According to the invention, the cell is divided by a cation selective membrane into a cathode compartment (2) to be filled with said liquid, and an anode compartment (3) to be filled with an anolyte containing an aqueous solution of an alkali or hydrogen halide such as sodium bromide or sodium chloride, and the membrane (1) is constituted by a microporous fabric of PTFE.

9 Claims, 1 Drawing Sheet

PROCESS FOR REMOVING NITROGEN COMPOUNDS FROM A LIQUID

The invention concerns a process for removing nitrogen compounds from an aqueous liquid containing nitrogen oxides $NO_x$ and/or nitrates $NO_3^-$, the device comprising an electrolytical cell with a cathode and an anode and a current source applicable thereto.

BACKGROUND OF THE INVENTION

Environmental protection requires a considerable reduction of the emission of nitrogen oxides in waste gases. As an example, the present limit set by the European Community directives require a reduction of the content of nitrogen oxides to a maximum of 200 mg/m³ (calculated as $NO_2$) in flue gases from large scale power stations. These low concentrations cannot be obtained only by special measures during the combustion process (so-called primary measures) but require the application of special processes for the removal of nitrogen oxides from waste gases, i.e. denoxing processes.

The process for the removal of nitrogen oxides consists in the reduction of the compound to nitrogen. For flue gases, several industrial processes are already known (Chem. Ing. Techn. 57, 1985, page 717 to 727).

The presence of nitrates in waste waters is also a growing problem. The intensive use of natural manure and fertilizers in agriculture leads to an increasing content of nitrates in subsoil water. In many places in Europe, drinking water producers have difficulties in maintaining the limit below 50 mg/m³ of nitrates in their final product.

The usual way of removing nitrates from waste waters is by biological processes which are slow and expensive. EP-A-0 243 889 discloses a process for the electrolytic denoxing of flue gases. The nitrogen oxides are absorbed in a iron-ethylene diamine-tetraacetic acid (Fe-EDTA) complex. The reduction occurs then according to the following reaction equation:

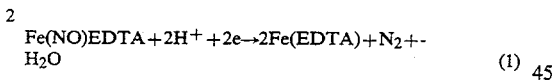

$$2 Fe(NO)EDTA + 2H^+ + 2e \rightarrow 2Fe(EDTA) + N_2 + H_2O \qquad (1)$$

However, in practice it has been found, that the electrolytic reduction of this complex leads to the formation of ammonia and, as an intermediate product, of hydroxylamine according to the following reaction equations:

$$Fe(NO)(EDTA) + 3 H^+ + 3 e \rightarrow Fe(EDTA) + NH_2OH \qquad (2)$$

$$Fe(NO)EDTA + 5 H^+ + 5 e \rightarrow Fe(EDTA) + NH_3 + H_2O \qquad (3)$$

For the development of an attractive denoxing process, the formation of ammonia in the catholyte is not desired since the removal of the ammonia from this liquid presents new problems. Therefore it would be highly desirable that the nitrogen oxides could be converted into gaseous nitrogen.

It is already known that $NH_3$ can be oxidized to nitrogen by chemical oxidation with hypobromides and hypochlorides according to the following reactions:

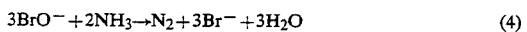

$$3BrO^- + 2NH_3 \rightarrow N_2 + 3Br^- + 3H_2O \qquad (4)$$

If a solution containing ammonia and bromide ions is submitted to electrolysis, primarily bromine will be formed at the anode:

$$2Br^- \rightarrow Br_2 + 2e \qquad (5)$$

It is further known from French Patent 1 493 735 to produce bromine by electrolysis in a cell which is derided by a microporous fabric into two reaction chambers. Bromine production in an electrolytic cell is also mentioned in the first quoted document EP-A 0 243 889.

As bromine is unstable in alkaline solutions, the following disproportionation reaction occurs:

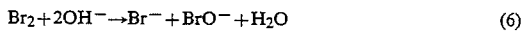

$$Br_2 + 2OH^- \rightarrow Br^- + BrO^- + H_2O \qquad (6)$$

Subsequently, the formed hypobromide oxidizes ammonia to nitrogen according to reaction (4).

In acidic solutions, bromine is stable and oxydizes ammonia according to the following reaction:

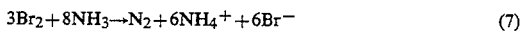

$$3Br_2 + 8NH_3 \rightarrow N_2 + 6NH_4^+ + 6Br^- \qquad (7)$$

It thus follows that the presence of bromine in alkaline or acid solutions in the anodic compartment leads to the chemical oxidation of ammonia and the formation of gaseous nitrogen. However, it must be noted that during the electrolysis reduction, ammonia is formed in the cathodic compartment.

SUMMARY OF THE INVENTION

The object of the present invention is to provide a simple, compact and reliable process which is apt to be realized on an industrial scale for removing from an aqueous liquid considerable amounts of nitrogen oxides, i.e. either $NO_x$ and/or $NO_3^-$.

This problem is solved by the process as defined in claim 1. As far as preferred embodiments of this process are concerned, reference is made to the dependent claims.

The invention will now be described in detail with reference to two preferred embodiments thereof and with the drawings.

DETAILED DESCRIPTION OF THE DRAWING

The main feature of the present invention is the reduction of nitrogen oxides to ammonia or hydroxylamine and the subsequent oxidation of these compounds to gaseous nitrogen. Both steps can be carried out in one single electrolytic cell. The cathode compartment of this cell is used for the reduction of nitrogen oxides and the anode compartment is used for the oxidation of ammonia and hydroxylamine, respectively to gaseous nitrogen. The two compartments are separated by a cation selective membrane or diaphragm. Surprisingly, it has been observed that the ammonia formed in the cathode compartment of the cell is transported through the membrane to the anode and immediately reacts electrolytically with the bromine formed in the anode compartment.

Figure 1:
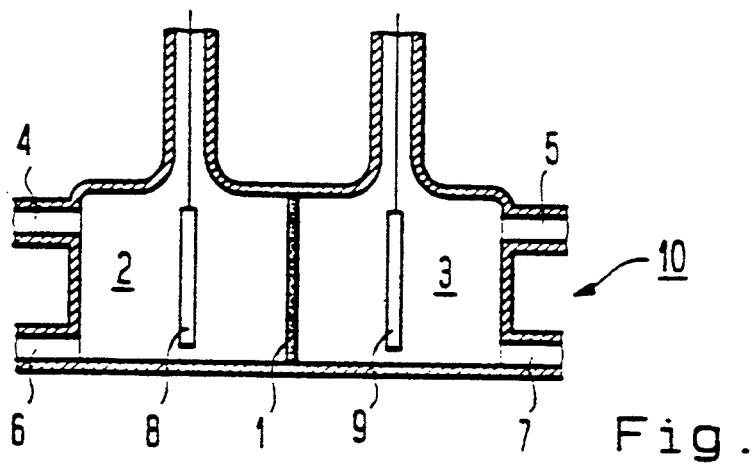
FIG. 1 shows schematically an electrolytic cell used in the process according to the invention.

Such a cell is schematically shown in FIG. 1. The cell is divided by a cation selective membrane 1 into a cathode compartment 2 and an anode compartment 3. The membrane is a microporous fabric, especially of polytetrafluorethylene fibers or of fibers containing carbon fluorine backbone chains with perfluoro side chains having sulphuric or carboxylic acid groups. The thickness of the membrane is between 10 and 80 μm, preferably between 20 and 40 μm. Both compartments are provided with inlets 4, 5 and outlets 6, 7 respectively, and electrodes 8, 9 are provided in each of the compartments. The electrodes may be connected to a DC current source (not shown). The current polarity is such that the compartment 2 constitutes the cathode compartment and the compartment 3 constitutes the anode compartment.

According to a first aspect, the inventive method concerns the denoxing of the above mentioned Fe-EDTA complex in the frame of a flue gas purification plant. Such a plant is partly indicated in FIG. 2 and contains a cell 10 in accordance with FIG. 1. The flue gases pass subsequently through a washing column 11 and an absorption column 12. They are then conveyed to a chimney 15. These columns are located at the outlet of a flue gas desulphurizing plant as disclosed in the above quoted document EP-A-0 243 889.

As stated above, the electrolytic cell 10 is divided, into two compartments, and the two compartments are respectively integrated into two different liquid conveying loops. The cathode compartment 2 is fed with an aqueous solution containing Fe(NO)EDTA from the absorption column 12 and supplies to this column an aqueous solution containing Fe(EDTA).

The anode compartment 3 is fed with a scrubber liquid from the washing column containing between 0.1 and 0.5% by weight of HBr and between 0.1 and 0.5% by weight of sulphuric acid $H_2SO_4$. The scrubber liquid leaving this compartment 3 is again supplied to the washing column 11.

Figure 2:
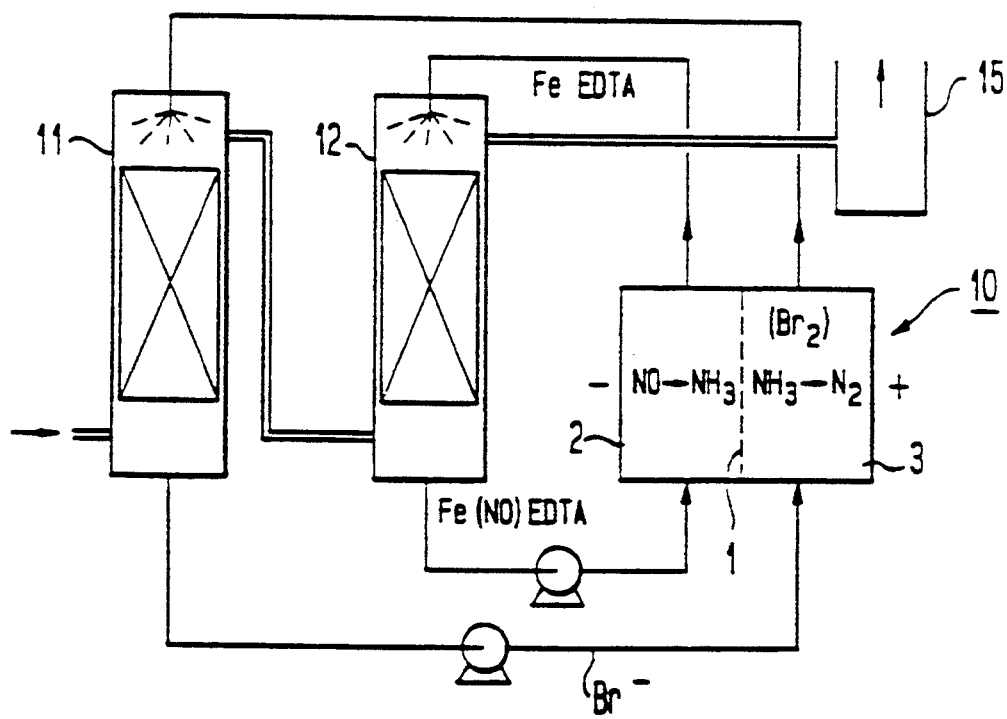
FIG. 2 shows the application of this invention to a flue gas purification plant where $NO_x$ is removed from the flue gas.

The liquid containing $NO_x$ is passed through the cathode compartment, where the complex is decomposed into ammonia $NH_3$ and Fe(EDTA) according to reaction (3). The ammonia formed in the cathode compartment diffuses through the cell membrane and is oxidized in the anode compartment to nitrogen $N_2$ and hydrogen $H_2$. In the anode compartment, also $Br_2$ is formed (reaction N° 5), which can be recirculated either to the washing column 11, as is shown in FIG. 2, or else to the reactor of the desulphurization process (not shown).

The following table I shows-laboratory results of the reactions proceeding in the two compartments of the electrolytical cell.

The cell used in this laboratory scale experiment is equipped with an anode consisting of a 4 cm² graphite cylinder, a cathode consisting of a 10 cm² Pt cylinder and a membrane consisting of a PTFE fabric with an surface area of 20 cm² and a thickness of 0.02 mm. The initial composition of the catholyte is shown in the first column of table I. The test temperature is 25° C. and the current applied to the cell is 500 mA. The second column of table I shows the composition of the catholyte after four hours of operation. It can be seen that the contents of nitrogen oxides and ammonia are substantially reduced.

TABLE I

|  | Cathode initial conc. (mmol/l) | Cathode final conc. (mmol/l) | Anode initial conc. (mmol/l) | Anode final conc. (mmol/l) |
|---|---|---|---|---|
| EDTA | 100 | 100 | — | — |
| NO | 50 | 10 | — | — |
| NH₃ | 345 | 314 | — | — |
| Br⁻ | 600 | 600 | 1000 | 740 |
| Br₂ | — | — | — | 170 |
| pH | 7.0 | 11.5 | 10.0 | 2.4 |

In the anolyte, (initial composition in column 3, final composition shown in column 4) there are no nitrogen compounds, the nitrogen having escaped in gaseous form ($N_2$).

A similar experiment is shown by table II. In this case, the experiment is carried out at 60° C. and, due to the presence of 100 mmol/l of $H_2SO_4$, the initial pH value of the anolyte is as low as 1,0. A current of 340 mA is applied to the cell and the experiment is proceeded for three hours. The substantial decrease of the ammonia and NO concentration in the catholyte is again very clearly demonstrated. However, in this experiment the ammonia conversion in the anolyte is not complete. In fact, there remains a small equilibrium concentration (27 mmol/l) due to the less favorable chemical equilibrium.

TABLE II

|  | Cathode initial conc. (mmol/l) | Cathode final conc. (mmol/l) | Anode initial conc. (mmol/l) | Anode final conc. (mmol/l) |
|---|---|---|---|---|
| EDTA | 100 | 100 | — | 2 |
| NO | 40 | 10 | — | — |
| NH₃ | 338 | 319 | — | 27 |
| Br⁻ | — | 10 | 330 | 184 |
| Br₂ | — | — | — | 80 |
| pH | 6.8 | 6.5 | 1.0 | 1.0 |

This second experiment is well adapted to a desulphurization process in which the anolyte contains a relatively high amount of sulphuric acid and the pH value is low.

It should be noted that the Fe(EDTA) complex cited above can be replaced by other members of the EDTA family such as nitrilotriacetic acid (NTA) or N(hydroxyethyl)ethylene diaminetriacetic (FeII-HEDTA).

Figure 3:
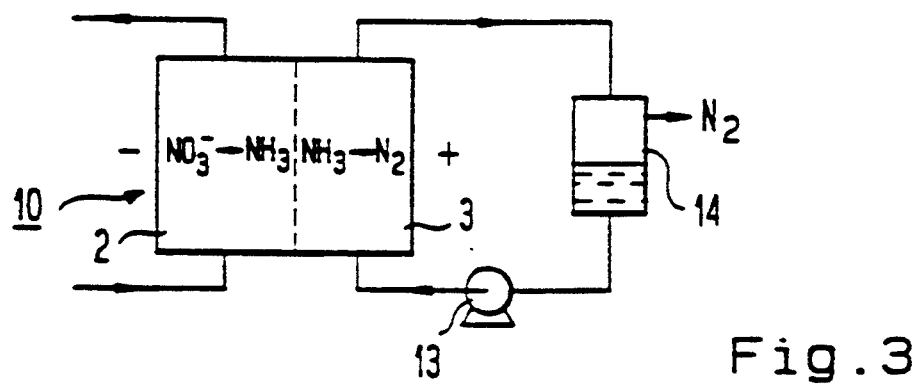
FIG. 3 represents schematically the application of this invention to the purification of liquids, in particular waste water including nitrates ($NO_3^-$).

Another application of the inventive method concerns the removal of nitrates from waste waters. The corresponding device is shown in FIG. 3, and it is a very simple device, as it almost exclusively consists of the cell 10. The cathode compartment is included in a waste water loop, waste water with nitrates being fed to this compartment and purified waste water without nitrates being collected at the outlet of this compartment. The corresponding reaction equation is as follows:

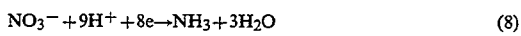

$$NO_3^- + 9H^+ + 8e \rightarrow NH_3 + 3H_2O \qquad (8)$$

The anodic loop conveys an anolyte consisting of a bromide or chloride solution, for example 0.5% by weight HBr or NaBr. The anodic loop further contains a recirculation pump 13 and a gas separator vessel 14 from which $N_2$ may escape.

Table III shows the initial and final compositions of the catholyte and the anolyte obtained in an experiment similar to those referred to in tables I and II and concerning the purification of $NO_3^-$ containing waste water. The experiment is carried out at a temperature of 60° C., the anode consists of a 4 cm² graphite electrode and the cathode of a 210 cm² copper cathode.

As in the above quoted experiments, this table shows that the nitrates are reduced to ammonia in the cathode compartment and subsequently oxidized to nitrogen in the anode compartment.

TABLE III

|  | Cathode initial conc. (mmol/l) | Cathode final conc. (mmol/l) | Anode initial conc. (mmol/l) | Anode final conc. (mmol/l) |
| --- | --- | --- | --- | --- |
| $NO_3^-$ | 120 | 77 | — | 5 |
| $NH_3$ | — | 28 | — | — |
| $Br^-$ | 633 | 650 | 595 | 210 |
| $Br_2$ | — | — | — | 165 |
| pH | 1.6 | 12.0 | 5.4 | 2.3 |

In the frame of this invention, the anolyte may contain chlorine or iodine instead of bromine.

We claim:

1. A process for removing nitrogen compounds from an aqueous liquid containing at least one of nitrogen oxides ($NO_x$) and nitrates ($NO_3^-$), using a device comprising an electrolytic cell divided into a cathode compartment and an anode compartment by a cation selective membrane constituted by a microporous fabric, comprising the steps of:
   i) supplying the liquid to be treated as a catholyte to the cathode compartment of the electrolytic cell;
   ii) circulating an anolyte containing an aqueous solution of an alkali or hydrogen halide through the anode compartment of the cell; and
   iii) applying an electric current to the cell,
   wherein nitrogen oxide and nitrates contained in the liquid to be treated are reduced to ammonia at the cathode, halogen gas is formed at the anode by electrolytic oxidation of the halide, ammonia formed in the cathode compartment is transported through the cation selective membrane to the anode compartment, and the transported ammonia electrolytically reacts with halogen gas in the anode compartment to form nitrogen.

2. A process according to claim 1, wherein the cation selective membrane thickness is between 10 μm and 80 μm.

3. A process according to claim 1, wherein the microporous fabric is made from synthetic fibers selected from the group consisting of polytetrafluorethylene (PTFE) and carbon fluorine backbone chains with perfluoro side chains containing sulfuric or carboxylic acid groups.

4. A process according to claim 1, wherein said circulating step comprises circulating the anolyte in a loop comprising said anode compartment, a recirculation pump and a gas separator vessel, and the upper part of said vessel is provided with a gas outlet.

5. A process according to claim 1, wherein said anolyte is an aqueous solution containing between 250 and 600 mmol/l of NaBr.

6. A process according to claim 1, wherein said anolyte is an aqueous solution containing between 250 and 600 mmol/l of NaCl.

7. A process according to claim 1, wherein the anolyte has an initial pH value of at least 7.

8. A process according to claim 1, wherein the liquid supplied to the cathode compartment contains an iron-ethylene diamine tetraacetic acid complex (fe-EDTA) or an iron-trinitrilo acetic acid complex (Fe-NTA) or a N(hydroxyethyl)ethylene diaminetriacetic acid (FeII-HEDTA) complex with nitrogen oxide (NO) absorbed thereto.

9. A process according to claim 1, wherein the halogen gas is bromine.

* * * * *